United States Patent [19]
Noller

[11] Patent Number: 5,155,767
[45] Date of Patent: Oct. 13, 1992

[54] METHOD AND APPARATUS FOR MANUFACTURING PRE-RECORDED VIDEOTAPE PROGRAMS

[76] Inventor: Robert R. Noller, 7551 Nohapa Cove, Germantown, Tenn. 38138

[21] Appl. No.: 790,428

[22] Filed: Nov. 12, 1991

[51] Int. Cl.⁵ .................................... H04N 7/167
[52] U.S. Cl. ............................. 380/5; 380/15; 360/60; 358/335
[58] Field of Search ............... 380/5, 7, 15; 360/37.1, 360/60; 358/335, 318, 319, 338

[56] References Cited

U.S. PATENT DOCUMENTS

| | | | |
|---|---|---|---|
| 4,213,149 | 7/1980 | Janko | 360/60 X |
| 4,631,603 | 12/1986 | Ryan | 360/37.1 |
| 4,695,901 | 9/1987 | Ryan | 358/319 X |
| 4,716,588 | 12/1987 | Thompson et al. | 380/15 X |
| 4,819,098 | 4/1989 | Ryan | 360/37.1 |
| 4,888,649 | 12/1989 | Kagota | 360/37.1 X |

FOREIGN PATENT DOCUMENTS

2055501  3/1981  United Kingdom ............... 360/37.1

Primary Examiner—Tod R. Swann
Attorney, Agent, or Firm—Walker, McKenzie & Walker

[57] ABSTRACT

A method and apparatus for manufacturing a videotape from a video signal so as to inhibit the making of acceptable copies thereof. The video portion of a video signal from a video source is looped through a sync generator to a frame store to provide the video signal with new vertical positioning and blanking. The output video signal from the frame store is sent to a dual vertical sync inserter to insert a second vertical sync onto the video signal. The output video signal from the dual vertical sync inserter is then sent to a video recorder for recording onto a videotape.

8 Claims, 5 Drawing Sheets

METHOD AND APPARATUS FOR MANUFACTURING PRE-RECORDED VIDEOTAPE PROGRAMS

BACKGROUND OF THE INVENTION

1. Field of the Invention

The present invention relates, in general, to a method and apparatus for manufacturing pre-recorded video cassettes which cannot be copied by ordinary means without technical impairments caused by playback speed variations introduced onto the copy.

2. Description of the Related Art

The most used videotape format for program distribution to consumers is the VHS ® system. Prior methods and apparatuses have been developed to produce videotapes which reproduce acceptable picture and sound when played but which produce unacceptable copies. It is believed that the current state-of-the-art for inducing technical impairments when copies of copyrighted tapes are attempted is the methods described in Ryan, U.S. Pat. Nos. 4,819,098, issued Apr. 4, 1989, and Ryan, 4,631,603, issued Dec. 23, 1986. Both of these patents disclose methods designed to "fool" the automatic gain circuits (AGCs) of video cassette recorders (VCRs).

The Ryan '603 patent discloses a method and apparatus for "confusing" or causing misoperation of the AGCs in a videocassette recorder by adding a train of pseudo-sync pulses to a video signal during the vertical blanking interval thereof, and following each pseudo-sync pulse by a positive pulse of suitable amplitude and duration, to cause the AGCs system in a given videotape recorder to make an erroneous measurement of the video signal level, and thereby cause an unacceptable recording of the video signal.

The Ryan '098 patent discloses a method and apparatus for "confusing" or causing misoperation of the AGCs in a video cassette recorder by adding a plurality of positive pulses to the video signal with each immediately following a respective trailing edge of a normally occurring sync pulse. These added pulses are clustered at the vertical blanking interval of each field to minimize the affect of the same on the viewability of the picture defined by the signal while still causing the automatic level control circuit in a recorder to assess the video level at many times its actual value.

The desired results of both the Ryan '603 patent and the Ryan '098 patent depend upon the VCR used to make the copy having AGCs, and the effectiveness of both the Ryan '603 patent and the Ryan '098 patent depends upon the responsiveness of the AGCs.

No known prior art method or apparatus discloses or suggests the present invention. More specifically, no known prior art method or apparatus for manufacturing a videotape from a video signal loops the video portion of a video signal from a video source through a sync generator means to a frame store means for providing the video portion of the video signal with new vertical positioning and blanking; passes the output video signal from the frame store means to a dual vertical sync inserter means for inserting a second vertical sync onto the video signal; and then passes the output video signal from the dual vertical sync inserter means to a modified video recorder for recording onto a videotape.

No know prior art method or apparatus discloses or suggests the present invention. More specifically, no known prior art method or apparatus discloses manufacturing a videotape from a video signal by looping the video portion of a video signal from a video source through a sync generator means to a frame store means for providing said video portion of said video signal with new vertical positioning and blanking; passing the output video signal from said frame store means to a dual vertical sync inserter means for inserting a second vertical sync onto said video signal; and then passing the output video signal from said dual vertical sync inserter means to a modified video recorder for recording onto a videotape.

SUMMARY OF THE INVENTION

Businesses and individuals in entertainment, teaching and other fields, who produce and/or market videotapes and the like, lose considerable sales each year because of the illegal copying of such videotapes. The present invention is directed toward providing an improved method and apparatus for manufacturing pre-recorded videotapes which cannot be copied without severe technical impairments. The impairments are such that the entertainment or information value is diminished. The present invention works on the principle that a dual vertical synchronizing signal can be implemented which will cause a modified video recorder to produce a faulty recording while allowing a pre-recorded video cassette to play and display in an acceptable manner.

One object of the present invention is to provide such a method and apparatus which are not limited to VCRs which have AGCs. Many VCRs used in the home and office do not employ AGCs. Also, personal computers are now able to work with VCRs Most VCRs used in conjunction with personal computers or the like, both in the home and office, are normally models intended for editing and either do not utilize AGCs or have an off/on switch for the AGCs. Further, digital video recording promises to be the next major improvement in the consumer level of home entertainment and, in the case of digital input to the record machine, AGCs will not be required. Present day professional equipment in the digital domain is either digital in and out, or analogue or digital in and out. In the case of analogue inputs, the analogue signal is usually restricted as to voltage levels to keep the signal from overdriving the necessary analogue to digital convertors. Present methods used to "fool" AGCs may be restricted to prevent the overdriving, thus reducing the effectiveness when manufacturing digital tapes.

An object of the present invention is to provide such a method and apparatus of manufacturing a videotape which will play for the intended user but which may not be copied without picture and sound distortion and which will work with VCRs incorporating AGCs as well as those VCRs which do not incorporate AGCs.

An object of the present invention is to provide such a method and apparatus that are applicable to present day analogue recording as well as future digital recording.

An object of the present invention is to provide such a method and apparatus that are applicable to future High Definition television.

Another object of the present invention is to provide such a method and apparatus which will work on any tape recording format where longitudinal tape movement with rotary video heads and stationary control track (CT) and audio heads are employed.

Another object of the present invention is to provide a new dual vertical sync structure for the manufacture of pre-recorded videotapes.

Another object of the present invention is to provide a new dual vertical sync structure for a videotape which will cause a VCR to record a defective control track if it is attempted to copy the videotape.

Another object of the present invention is to provide a new dual vertical sync structure which is highly compatible with existing television receiver/monitors.

Another object of the present invention is to provide a new dual vertical sync structure which will cause copies made by simple machine-to-machine connection to have technical impairments due to speed variations on playback.

Another object of the present invention is to provide a new dual vertical sync structure which causes a VCR to record a defective control track and prevents non-impaired machine-to-machine copying of a pre-recorded videotape, regardless of whether the VCR has AGC's or not.

Another object of the present invention is to provide a new dual vertical sync structure which causes a VCR to record a defective control track and prevents non-impaired machine-to-machine copying of a pre-recorded videotape without signal level variations of the sync signal.

Another object of the present invention is to provide a new dual vertical sync structure which causes rapid horizontal picture movement impairments.

Another object of the present invention is to provide a new dual vertical sync structure which causes intermittent pitch changes on the longitudinal audio track(s).

Another object of the present invention is to provide a new dual vertical sync structure which causes intermittent drop out of Hi-Fi audio tracks.

Another object of the present invention is to provide a new dual vertical sync structure which causes a VCR to record a defective control track and prevents non-impaired machine-to-machine copying of a pre-recorded videotape at all VCR speeds (e.g., standard play, long play and extended play).

Another object of the present invention is to provide a new dual vertical sync structure which causes a VCR to record a defective control track and prevents non-impaired machine-to-machine copying of a pre-recorded videotape on any video recorder utilizing rotary video heads and stationary control track and audio track heads.

Another object of the present invention is to provide a new dual vertical sync structure which causes a VCR to record a defective control track and prevents non-impaired machine-to-machine copying of a pre-recorded videotape on digital format VCRs.

Another object of the present invention is to provide a new dual vertical sync structure which causes a VCR to record a defective control track and prevents non-impaired machine-to-machine copying of a pre-recorded videotape on high definition television and videotape systems.

Another object of the present invention is to provide a new dual vertical sync structure which causes a VCR to record a defective control track and prevents non-impaired machine-to-machine copying of a pre-recorded videotape by placement of a "second" pulse in the active picture area.

Another object of the present invention is to provide a new dual vertical sync structure which causes a VCR to record a defective control track and prevents non-impaired machine-to-machine copying of a pre-recorded videotape by direct machine connection by means of radio frequency or baseband video and audio cables.

Another object of the present invention is to provide a new dual vertical sync structure which causes a VCR to record a defective control track and prevents non-impaired machine-to-machine copying of a pre-recorded videotape without introduction of objectionable picture or sound distortions when the pre-recorded videotape is played.

Another object of the present invention is to provide a new dual vertical sync structure for the purpose of separation of television receiver/monitor vertical triggering and VCR speed control.

Another object of the present invention is to provide a new dual vertical sync structure which causes a VCR to record a defective control track and prevents non-impaired machine-to-machine copying of a pre-recorded videotape by causing speed variations of the copy when played back.

Another object of the present invention is to provide a new dual vertical sync structure and manufacturing process to manufacture pre-recorded videotapes which, if copied by ordinary means (e.g., machine to machine connection), will cause a playback speed error due to new vertical sync structure resulting in objectionable picture and sound distortions which greatly reduce the program value.

Another object of the present invention is to provide a method for manufacturing pre-recorded videotapes which causes a VCR to record a defective control track and prevents non-impaired machine-to-machine copying thereof, by application of external sync to the machines used to manufacture a pre-recorded videotape.

Another object of the present invention is to provide a method for manufacturing pre-recorded videotapes which causes a VCR to record a defective control track and prevents non-impaired machine-to-machine copying thereof, and for correcting positional errors caused by the "second pulse" of a television receiver/monitor by advancing the vertical blanking and picture information.

Another object of the present invention is to provide a method for manufacturing pre-recorded videotapes which causes a VCR to record a defective control track and prevents non-impaired machine-to-machine copying thereof, and which is applicable to conventional video duplication facilities.

Another object of the present invention is to provide a method for manufacturing pre-recorded videotapes which causes a VCR to record a defective control track and prevents non-impaired machine-to-machine copying thereof, and which is applicable to high speed video duplication facilities.

The present invention allows a videotape to be manufactured by looping the video portion of a video signal from a video source through a sync generator means to a frame store means for providing said video portion of said video signal with new vertical positioning and blanking; passing the output video signal from said frame store means to a dual vertical sync inserter means for inserting a second vertical sync onto said video signal; and then passing the output video signal from said dual vertical sync inserter means to a modified video recorder for recording onto a videotape.

DESCRIPTION OF THE PREFERRED EMBODIMENT

The present television system used in the United States was standardized in the late 1940's by the Electronic Industry Association (EIA) and described in standard RS-170 for monochrome transmission. Sometime later the National Television Standards Committee (NTSC) standardized the present compatible color system which is known worldwide as the NTSC system. The NTSC system slightly modified the scanning frequencies and added a color subcarrier to the original EIA RS-170 standard. Synchronizing (sync) signals remained the same in terms of placements and widths as did the vertical and horizontal blanking signals.

A television picture consists of structured scanning lines containing brightness and color information. This scanning structure is rigidly controlled by specification of the NTSC standard from origin to the home display.

Video recording devices utilize a portion of the NTSC signal for speed stability during the record mode. The vertical sync is used during the record mode. This same vertical sync controls the vertical scanning of a television receiver or monitor. Therefore, the requirements for display and video recording are quite similar.

The part of the television signal which controls television receiver/monitor scanning is called the synchronizing (sync) pulses. The portion of the sync signal that controls television receiver/monitor vertical scanning is called the vertical sync (see FIG. 6). This same vertical sync is used as reference on video cassette recorders (VCRs) during record operation to record a control track (see FIG. 5) which will be used when the recording is played to control the speed of the VCR.

The present invention relies upon the fact that if changing vertical sync information is presented to the input of a video recorder, a faulty control track signal will be recorded. However, this changing vertical sync information should not exclude acceptable playback of a videotape. The desired effect of an unacceptable playback is only in the case of when a copy is made from copyrighted material (i.e., only in the event of an illegal copy). The present invention discloses a way to add a second vertical sync which will allow application of the present invention.

Figure 1:
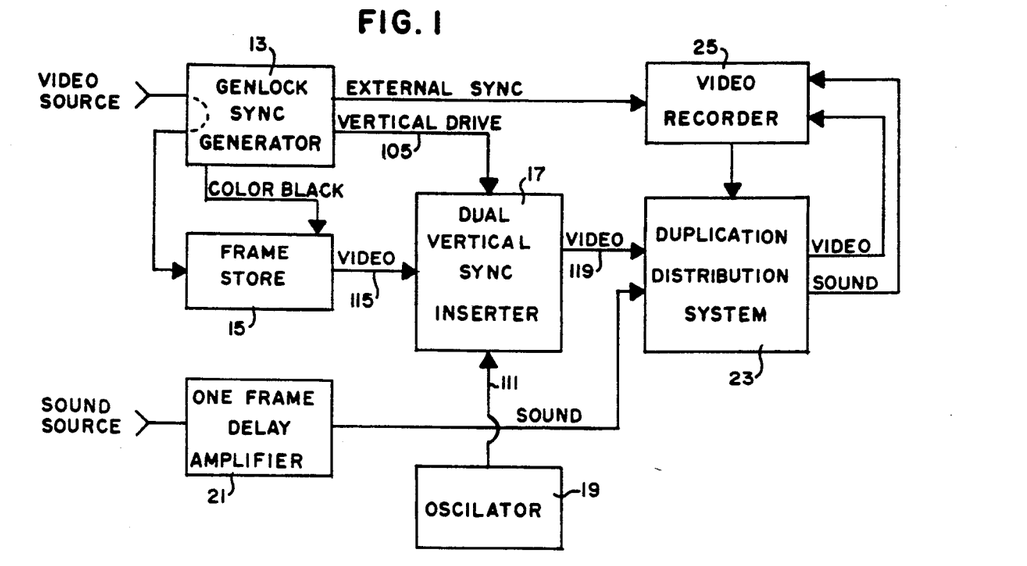
FIG. 1 is a block diagram of the dual vertical synchronizing system of the present invention.

A block diagram of the preferred embodiment of the present invention for manufacture of pre-recorded videotapes from which acceptable copies may not be made is shown in FIG. 1. The video portion of the program loops through a Genlock sync generator 13 and terminates at the input of a frame store 15 which provides new vertical positioning and blanking. Frame store 15 receives Color Black from the Genlock sync generator 13 for timing synchronization.

The video output from the frame store 15 goes to a video signal dual vertical sync inserter 17 where a second "vertical sync" is inserted and modulated in width. The modulation is applied from an oscillator 19. The second vertical sync pulse is derived from the vertical drive signal from the Genlock sync generator 13.

Program sound is sent to a one frame delay amplifier 21 to delay the audio the same as the video was delayed in the frame store 15 to preserve sound sync.

Video from the dual vertical sync inserter 17 and audio from the one frame delay amplifier 21 is sent to a duplication distribution system 23 which sends the signals to a video recorder 25. External sync is used from the Genlock sync generator 13 to drive the servo circuits of the video recorder 25. This requires modification to the video recorder 25. The modification consists of breaking the normal separated sync path in the video recorder 25 and connecting the external sync to the servo inputs.

The external sync produces a stable control track on the manufactured pre-recorded videotape, while the dual sync signal will produce an unstable control track if an attempt is made to copy the manufactured videotape.

Anyone skilled in the art of television engineering will readily recognize the individual block components of FIG. 1 as readily available equipment with the exception of the dual vertical sync inserter 17.

Figure 3:
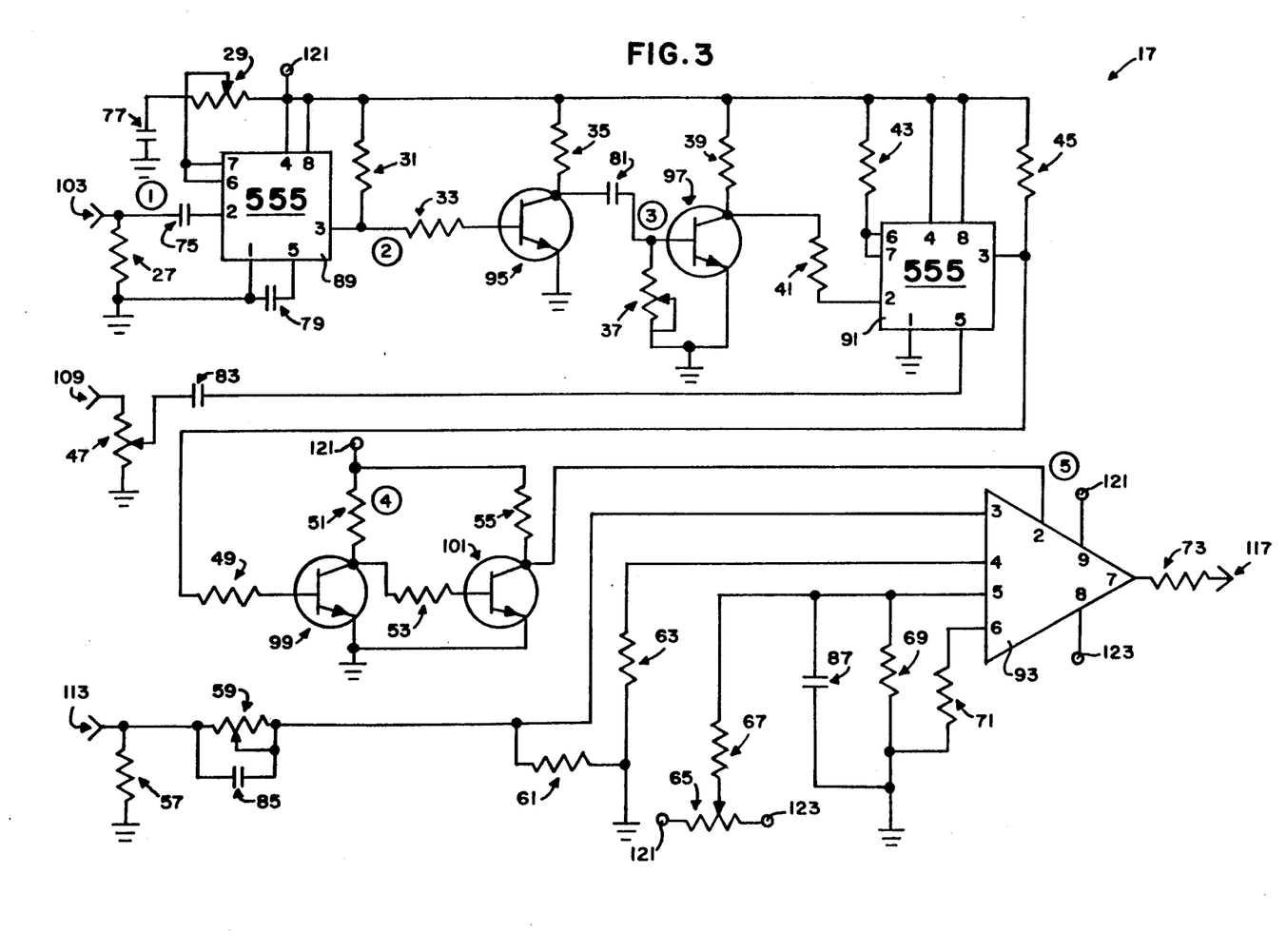
FIG. 3 is a schematic diagram of the preferred embodiment of the dual vertical sync inserter of the present invention.

FIG. 3 is an electrical schematic diagram of the preferred embodiment of the dual vertical sync inserter 17. While persons skilled in the art of television electronics will, based on the present disclosure, readily recognize and understand the circuitry shown in FIG. 3, such persons will also readily see that many different electronic circuits and components can be used to produce the same results.

With reference to FIG. 3, the preferred embodiment of the dual vertical sync inserter 17 includes the following readily available circuits and components: a 75 ohm first resistor 27, a 500 kilohm variable second resistor 29, a 1000 ohm third resistor 31, a 3900 ohm fourth resistor 33, a 3900 ohm fifth resistor 35, a 100 kilo ohm variable sixth resistor 37, a 3900 ohm seventh resistor 39, a 100 ohm eighth resistor 41, a 10 kilohm ninth resistor 43, a 1000 ohm tenth resistor 45, a 600 ohm eleventh resistor 47, a 3900 ohm twelfth resistor 49, a 3900 ohm thirteenth resistor 51, a 3900 ohm fourteenth resistor 53, a 3900 ohm fifteenth resistor 55, a 75 ohm sixteenth resistor 57, a 5 kilohm variable seventeenth resistor 59, a 470 ohm eighteenth resistor 61, a 470 ohm nineteenth resistor 63, a 10 kilohm variable twentieth resistor 65, a 100 ohm twenty-first resistor 67, a 470 ohm twenty-second resistor 69, a 470 ohm twenty-third resistor 71, a 1 kilohm twenty-fourth resistor 73, a 47 microfarad first capacitor 75, a 0.047 microfarad second capacitor 77, a 0.01 microfarad third capacitor 79, a 0.0068 microfarad fourth capacitor 81, a 0.01 microfarad fifth capacitor 83, a 10 picofarad sixth capacitor 85, a 0.01 microfarad capacitor 87, a 555 first integrated circuit 89, a 555 second integrated circuit 91, a MC1545L third integrated circuit 93, a 123AP first transistor 95, a 123AP second transistor 97, a 123AP third transistor 99, and a 123AP fourth transistor 101

The vertical drive signal 103 is input from the Genlock sync generator 13 through a conductor 105 (see FIG. 1) to the first integrated circuit 89 (a 555 timer chip). The second resistor 29 allows for delay of the vertical drive signal 103 so that the output of the first integrated circuit 89 produces a pulse (i.e., pulse 2 of FIG. 2) that is approximately 8 horizontal lines (about 512 microseconds) ahead of the next trigger pulse (i.e., pulse 1. of FIG. 2).

Figure 2:
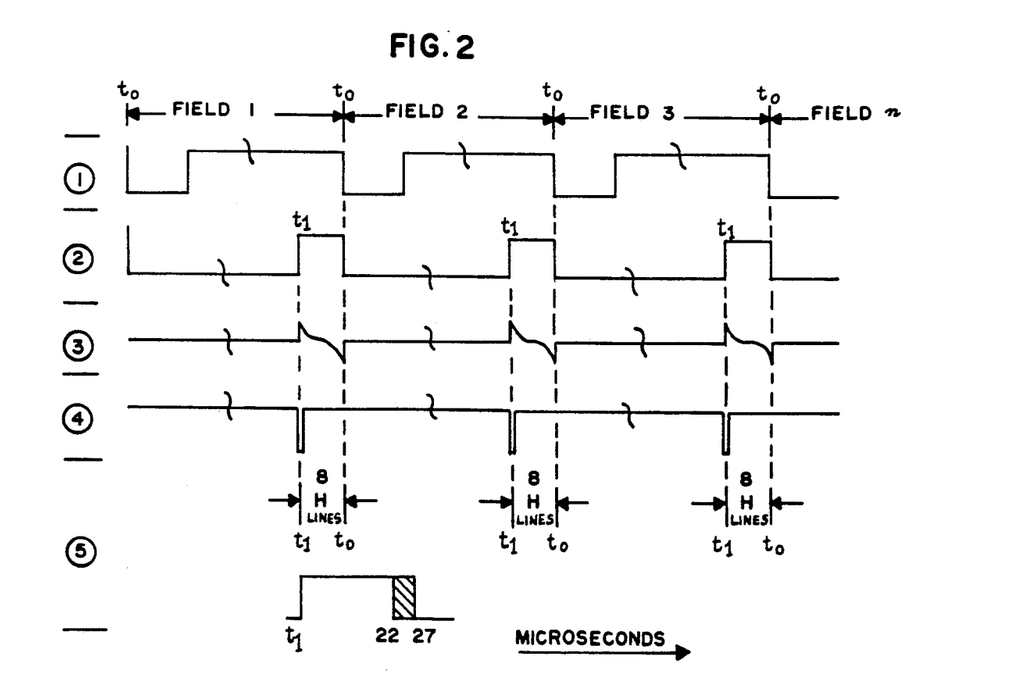
FIG. 2 is an illustration of waveforms present at selected points in the preferred embodiment of the dual vertical sync inserter of the present invention.

The pulse so produced by the first integrated circuit 89 is inverted by the first transistor 95, differentiated by the fourth capacitor 81 and the sixth resistor 37, producing the waveform 3 of FIG. 2, the positive portion turning on the second transistor 97 and triggering the second integrated circuit 91 (pulse width modulator).

The sixth resistor 37 on the base of the second transistor 97 sets the static pulse width on the output of the second integrated circuit 91 to approximately 22 microseconds.

When an oscillator signal 109 is applied from the oscillator 19 through a conductor 111 (see FIG. 1) to pin 5 of the second integrated circuit 91, the eleventh resistor 47 and the sixth resistor 37 are adjusted to output at pin 3 of the second integrated circuit 91, a pulse which varies from 22 to 27 mircoseconds in width (see pulse 4 of FIG. 2) at a rate determined by the oscillator frequency.

Isolation from the second integrated circuit 91 is provided by the third transistor 99. Inversion by the fourth transistor 101 applies the correct polarity signal to the third integrated circuit 93. The signal at pin 2 of the third transistor 99 is indicated by pulse 5 in FIG. 2 with the shaded area representing the varying pulse width.

Figure 9:
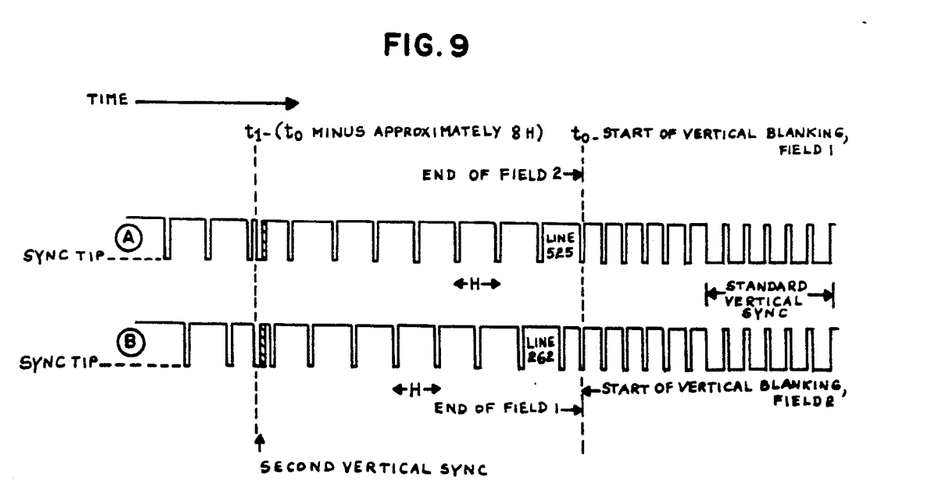
FIG. 9 illustrates the placement of a second vertical pulse just prior to the modified video output of the dual vertical sync inserter of the present invention.

The third integrated circuit 93 is a dual-channel wideband video amplifier. A video input signal 113 is applied from the frame store 15 through a conductor 115 (see FIG. 1) to pin 3 of the third integrated circuit 93. Input to pin 3 of the third integrated circuit 93 is output at pin 7 thereof, except when the pulse shown at 5 in FIG. 2 is applied to pin 2 of the third integrated circuit 93. During the time the pulse is applied, $T_1$ plus 22 to 27 microseconds, the video input applied to pin 3 of the third integrated circuit 93 is turned off and the input from pin 5 of the third integrated circuit 93 is output at pin 7 thereof. The twentieth resistor 65 sets the input direct current level of the pin 5 of the third integrated circuit 93 so that when output, the direct current level equals the sync tip level of the input signal of pin 3 of the third integrated circuit 93 as indicated in FIG. 9.

A modified video output signal 117 is sent from pin 7 of the third integrated circuit 93 through conductor 119 (see FIG. 1) to the duplication distribution system 23.

Electrical energy is supplied to the dual vertical sync inserter 17 through positive terminals 121 and negative terminals 123. More specifically, positive 8 volt electrical energy is preferably coupled to the terminals 121 and negative 8 volt electrical energy is preferably coupled to the terminals 123. Thus, a power supply or convertor may be provided for converting 117 volt alternating current household energy to 8 volt electrical energy as will now be apparent to those skilled in the art.

Persons skilled in the art of television electronics will readily recognize the circuitry and pulses shown by FIGS. 2 and 3, and will also readily see that many different electronic circuits can be used to produce the same results. The specific circuitry of the preferred embodiment shown in FIG. 2 was selected because of the ready availability of the individual components thereof.

Television systems depend upon a structured scanning method for proper orientations and reproductions of images. The system used in the U.S.A. is an interlaced structure which requires two field scans of 262.5 horizontal lines each to make one television frame. Frames are presented at a nominal rate of 30 frames per second.

Figure 6:
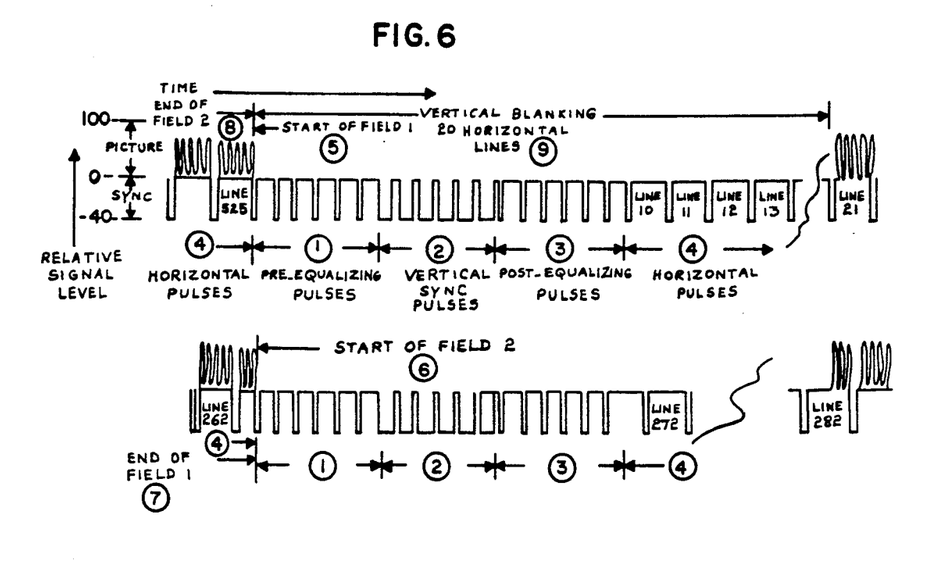
FIG. 6 is an illustration of the waveforms of the vertical sync interval fields of a single television frame.
Figure 8:
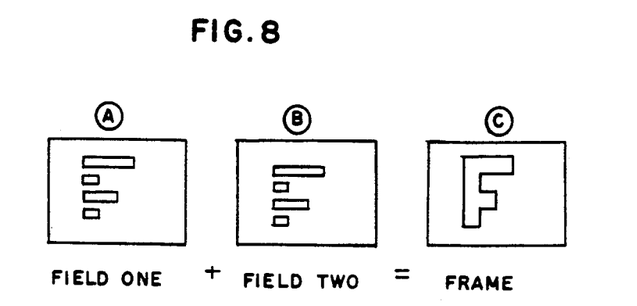
FIG. 8 illustrates the field sequence to produce one television frame.

With reference to FIGS. 6 and 8, a "walk through" of a single television frame begins at the start of field on where the vertical blanking turns off all visible picture information so that when the vertical sync pulses arrive, the vertical scan may be reset (usually by the 2nd or 3rd vertical sync pulse) and returned to the top for the first field scanning without the scanning beam being visible. At line 21, vertical blanking ends and once again picture information is presented as the scanning process starts down the picture display (see field one in FIG. 8). After scanning 262 and ½ horizontal lines, vertical blanking for field two starts. The process starts all over again with no brightness and with the beam returning to the top to then start scanning the second field with line number 282 (see field two in FIG. 8). On this second field, picture information is scanned in between the lines which were scanned in the first field. At the end of the field two, a single television frame consisting of 525 interlaced lines has been scanned (see the frame in FIG. 8).

Proper operation of a video recorder depends upon the vertical sync pulses, just as does a television receiver/monitor. During the video recording process, the machine's speed is referenced to the incoming video, more specifically, to Vertical Sync. A control track signal is recorded with the picture and sound so that when the tape recording is played back, it will play at a stable speed. During recording, the control track is derived from Vertical Sync. During playback, the speed is referenced to the control track playback. The present concept of using a dual vertical sync signal takes advantage of these two facts (i.e., that during recording, the control track is derived from Vertical Sync and during playback, the speed is referenced to the control track playback).

Figure 4:
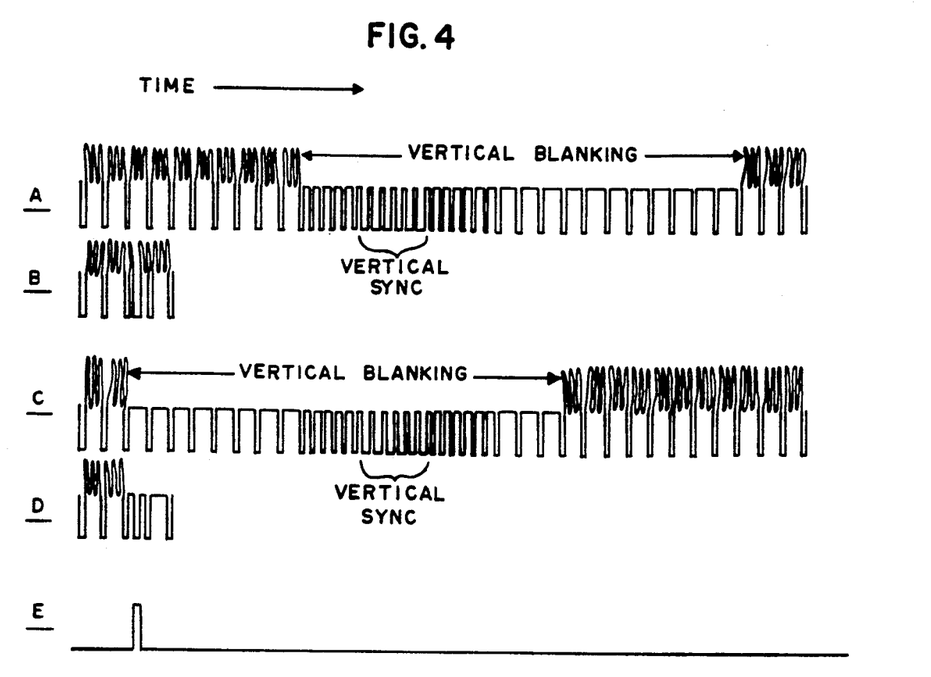
FIG. 4 is an illustration of waveforms used in a dual vertical synchronizing system of the present invention.

In FIG. 4, a regular standard video waveform around a vertical sync is indicated by the waveform A. Pulse E is added to this video creating a second vertical like sync pulse B during the time of the pulse E. Only the area about the pulse E is shown for simplicity. This is the modified video output signal 117 of FIG. 3 that is presented to the duplication distribution system 23 by the conductor 119 in FIG. 1.

Figure 5:
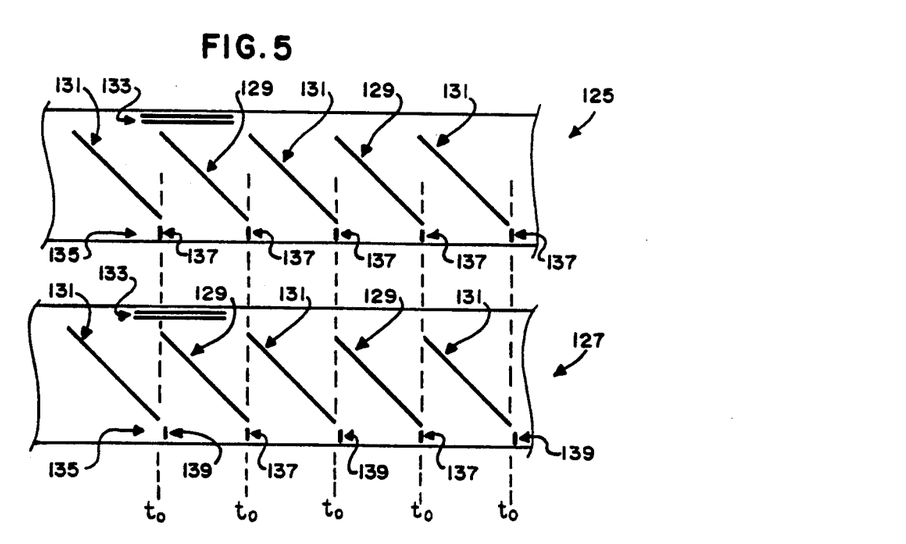
FIG. 5 is a diagrammatic view of magnetic tracks on portions of two videotapes with a normal control track on one of the portions and with an abnormal control track produced by the dual vertical synchronizing system of the present invention on the other portion.

The pulse E varies in width (see, e.g., the illustration of pulse 5 in FIG. 2) so at one instance during a recording, the control track signal is derived from "standard vertical sync". But since the pulse E of FIG. 4 has been deliberately designed to cause the control track to trigger at the widest width, when such width occurs, the recorder's speed control system will "trigger" about 8 lines early, creating a positional error in the recorded control track. FIG. 5 represents the magnetic flux patterns on a length of videotape.

In FIG. 5, a portion of a normal video tape is shown diagrammatically and identified by the numeral 125, and a portion of a modified video tape is shown diagrammatically and identified by the numeral 127. Magnetic tracks representing slanted video tracks of a first field are identified on both portions by the numeral 129. Magnetic tracks representing slanted video tracks of a second field are identified on both portions by the numeral 131. Magnetic tracks representing the audio track are identified on both portions by the numeral 133. Magnetic tracks representing the control track are identified on both portions by the numeral 135. The normal control track recordings are identified on both portions by the numeral 137. The modified control track recordings as produced by the present invention are identified on the modified portion 127 by the numeral 139. It is these modified control track recordings 139 which make the playback of a videotape exhibit technical aberrations because of speed variations.

Since the control track is derived from vertical sync, to make the original pre-recorded video cassette, external sync must be supplied to the video recorder so that a stable control track may be recorded. This is the standard sync signal from the Genlock sync generator 13 in FIG. 1.

Since the proper operation of receiver/monitors and video recorders are similar with respect to the vertical sync signal, the pulse width for the dual sync system of the present invention should be carefully chosen so that the dual sync will not upset receiver/monitor scanning circuits. A pulse of sufficient width (see pulse 5 in FIG. 2) will cause monitors/receivers to re-trigger scanning eight lines earlier than normal trigger time and increasing that width will have no further effect on triggering. Older monitor/receivers tend to ignore the "dual sync signal" and continue to trigger normally without instability. Most modern video recorders trigger on a pulse width of 22 to 27 microseconds.

Figures 7, 7A:
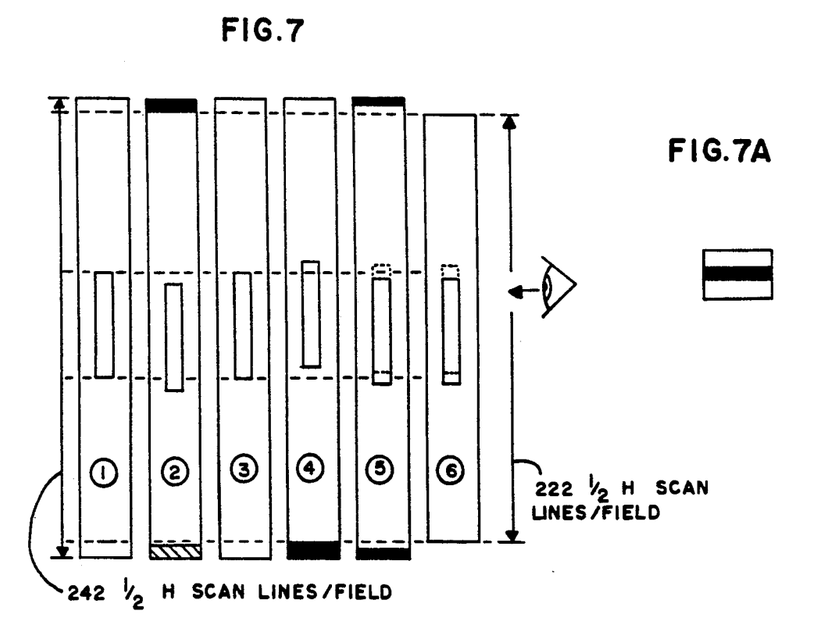
FIG. 7 illustrates what one would see if it was possible to look at a profile of a television tube.
FIG. 7A represents a television picture of a black horizontal bar over a white background.

Since displays are triggered early, provision is incorporated into the present invention to reposition the picture in the frame store 15 (see FIG. 1). This allows the picture to be repositioned as indicated by waveform C in FIG. 4. Ramifications of the repositioning are indicated in FIG. 7. Since some 40 scan lines are not visible due to vertical blanking, a maximum of 242 lines per field are visible. However, due to "overscan" in receiver/monitors, an additional nominal 20 lines are "lost" per field.

FIG. 7A represents a television picture of a black horizontal bar over a white background. If it were possible to look at a profile of the television tube, one would see the complete top to bottom picture structure as seen when the television triggers on normal vertical sync as indicated at 1 in FIG. 7. The second or "Dual Sync Pulse" would be represented by the long dash near the bottom of the tube. The positional changes that take place when the television triggers on the "Dual Sync Pulse" is indicated at 2 in FIG. 7 (i.e., the bar moves down about 8 television lines. If a viewer could see the complete top to bottom picture, the picture would be "lost" near the bottom of the tube, and blanking would be visible at the top of the tube. The display is restored to normal position as indicated at 3 in FIG. 7 by employing 8 lines of picture shifting in the frame store (Waveform C in FIG. 4). This same positional compensation and its effect on a television which triggers on the normal vertical sync is indicated at waveform 4 in FIG. 7. The conditions which result when only 4 lines of positional shifting is employed are indicated at 5 in FIG. 7; these result in a positional error of plus or minus 4 lines which is negligible. In any case, the viewer is not likely to see any abnormal picture conditions because of overscan as indicated by 6 in FIG. 7.

The dual vertical sync system of the present invention works on the basis of a new sync signal containing a pre-vertical sync signal which changes in width so as to present an ambiguous vertical signal to a video recorder. This ambiguous vertical signal produces an unstable control track on a video recording. The unstable control track causes unstable speed on playback. Pre-recorded videotapes are stable because of an external sync applied to the record machine(s).

Although the present invention has been described and illustrated with respect to a preferred embodiment and a preferred use therefor, it is not to be so limited since modifications and changes can be made therein which are within the full intended scope of the invention.

I claim:

1. A method for manufacturing a videotape from a video signal so as to inhibit the making of acceptable copies thereof; said method comprising the steps of:
    a) looping a video portion of a video signal from a video source through a sync generator means to a frame store means for providing said video portion of said video signal with new vertical positioning and blanking;
    b) passing an output video signal from said frame store means to a dual vertical sync inserter means for inserting a second vertical sync onto said video signal; and
    c) then passing an output video signal from said dual vertical sync inserter means to a video recorder for recording onto a videotape.

2. The method of claim 1 in which is included the step of passing a vertical drive signal from said sync generator means to said dual vertical sync inserter means and deriving the pulse for said second vertical sync from said vertical drive signal.

3. The method of claim 2 in which is included the step of applying an oscillator signal from an oscillator means to said dual vertical sync inserter means for modulating said dual vertical sync inserter means.

4. The method of claim 3 in which is included the step of sending an external sync signal from said sync generator means to said video recorder.

5. An apparatus for manufacturing a videotape from a video signal so as to inhibit the making of acceptable copies thereof; said apparatus comprising:
    a) a sync generator means for allowing a video portion of a video signal to be looped therethrough;
    b) a frame store means for receiving said video portion of said video signal from said sync generator means and for providing said video portion of said video signal with new vertical positioning and blanking;
    c) a dual vertical sync inserter means for receiving said video portion of said video signal from said frame store means and for inserting a second vertical sync onto said video signal; and d) a video recorder for receiving an output video signal from said dual vertical sync inserter means for recording onto a videotape.

6. The apparatus of claim 5 in which said sync generator means passes a vertical drive signal to said dual vertical sync inserter means; and in which said dual vertical sync inserter means derives the pulse for said second vertical sync from said vertical drive signal.

7. The apparatus of claim 6 in which is included an oscillator means for applying an oscillator signal to said dual vertical sync inserter means for modulating said dual vertical sync inserter means.

8. The apparatus of claim 7 in which said sync generator means sends an external sync signal to said video recorder.

* * * * *

UNITED STATES PATENT AND TRADEMARK OFFICE
CERTIFICATE OF CORRECTION

PATENT NO. : 5,155,767
DATED : October 13, 1992
INVENTOR(S) : Robert R. Nollner

It is certified that error appears in the above-identified patent and that said Letters Patent is hereby corrected as shown below:

Title page, Item [19] "Noller" should be Nollner

Title page, Item [76] "Noller" should be Nollner

Signed and Sealed this

Twelfth Day of January, 1993

*Attest:*

DOUGLAS B. COMER

*Attesting Officer*   *Acting Commissioner of Patents and Trademarks*